United States Patent [19]

Paranjpe et al.

[11] 4,259,696
[45] Mar. 31, 1981

[54] APPARATUS AND METHOD FOR JET DROP COPYING WITH AN ARRAY OF JETS AND PHOTODETECTORS

[75] Inventors: Suresh C. Paranjpe, Dallas, Tex.; Arthur Cox, Chicago, Ill.; Burton W. Scott, Plano; Eugene Nodov, Richardson, both of Tex.; Richard Sutera, Dayton, Ohio

[73] Assignee: The Mead Corporation, Dayton, Ohio

[21] Appl. No.: 75,063

[22] Filed: Sep. 12, 1979

[51] Int. Cl.³ .................. H04N 1/10; H04N 1/24
[52] U.S. Cl. .................................. 358/296; 346/75; 358/293
[58] Field of Search ............... 358/296, 298, 293, 285, 358/283; 346/75, 140 R; 250/236

[56] References Cited

U.S. PATENT DOCUMENTS

| | | |
|---|---|---|
| 1,883,019 | 10/1932 | Shore . |
| 2,262,584 | 11/1941 | Herriott . |
| 2,745,243 | 7/1943 | Seitz ..................... 358/296 |
| 3,360,659 | 12/1967 | Young . |
| 3,468,229 | 9/1969 | Bellows . |
| 3,560,641 | 2/1971 | Taylor .................... 358/296 |
| 3,689,693 | 9/1972 | Cahill et al. . |
| 3,694,070 | 9/1972 | Libby . |
| 4,051,538 | 9/1977 | Fox et al. ................. 358/296 |
| 4,112,469 | 9/1978 | Paranjpe et al. . |

OTHER PUBLICATIONS

Smith, Modern Optical Engineering, 1966, pp. 82-85.
Bullock, IBM Tech. Disclosure Bulletin, vol. 16, No. 4, pp. 1254-1255.

Primary Examiner—Raymond F. Cardillo, Jr.
Attorney, Agent, or Firm—Biebel, French & Nauman

[57] ABSTRACT

A jet drop copying apparatus has a print head which directs a row of jets toward a print sheet mounted on a rotating drum. The row of jets extend substantially across the full width of the print sheet and are operated under control of a printing controller to print a series of tracks extending circumferentially along the sheet. The jets are shifted laterally in synchronism with the drum rotation such that each jet is moved a distance equal to the width of one printing track during one rotation of the drum. The shifting continues until a solid print has been obtained. An illumination device is provided for illuminating a narrow strip extending across a document to be copied and projecting an image of the illuminated strip upon a row of photodetectors. Longitudinal image scanning proceeds in synchronism with the rotation of the printing drum, and there is a lateral shifting of the image in synchronism with the shifting of the jet printing tracks.

18 Claims, 15 Drawing Figures

APPARATUS AND METHOD FOR JET DROP COPYING WITH AN ARRAY OF JETS AND PHOTODETECTORS

CROSS-REFERENCE TO RELATED APPLICATIONS

This application is related to Application Ser. No. 075,067 entitled Lens System for Document Scanning, Application Ser. No. 075,052 entitled Document Scanning System, Application Ser. No. 075,054 entitled Document Illumination System, Application Ser. No. 075,297, entitled Document Illumination Apparatus, Application Ser. No. 075,055 entitled Improved Ink Jet Printer, Application Ser. No. 075,053 entitled Line Source Illuminator, Application Ser. No. 075,056 entitled Ink Jet Printer with Laterally Moveable Print Head, and Application Ser. No. 075,065 entitled Moving Image Scanner; all filed on Sept. 12, 1979, all currently pending, and all assigned to the assignee hereof.

BACKGROUND OF THE INVENTION

This invention relates to jet drop copying systems of the general type disclosed in Paranjpe et al U.S. Pat. No. 4,112,469. In the Paranjpe patent there is disclosed a scanning optical system which scans an original document and images a portion thereof upon the face of a photodetector array. The photodetectors within the photodetector array are arranged in correspondence with the arrangement an array of orifices in a jet drop print head. The jet drop print head projects drops of printing liquid from each of the orifices, and these drops are directed against a printing sheet mounted on a rotating drum. As the drum rotates, the print head prints a series of spaced tracks. Means for provided for advancing the print head in the axial direction in synchronism with the drum rotation, so that the printing tracks interlace in helical fashion.

As also taught in the Paranjpe patent, the photodetector array and the scanning optics are mounted on a table which translates in synchronism with the axial advance of the print head. The optics include a first lens which views a portion of the original document and collimates the light received from the portion which is viewed. The collimated light is directed against a scanning mirror, and from there it is reflected toward a second lens for imaging. The face of the photodetector array is positioned within the image plane of the second lens. The scanning mirror is rotated in synchronism with the rotation of the printing drum, so that there is continuous correspondence between the document spots being viewed by the photosensors and the printing sheet spots which are being printed by the jet drop print head.

The print head which is disclosed in the Paranjpe patent is considerably shorter than the printing drum, so that it requires a great number of drum rotations and a considerable amount of printing head movement to complete the printing of one copy. This severely limits the speed capability of the system. In this regard it should be noted that the system speed is limited not only by the length of the print head but also by the basic nature of the helical interlacing technique. Such interlacing requires considerable movement of the printing head, and as the head grows longer more movement is required for completion of the interlacing. This requirement for printing head movement applies equally to the table which moves the optical system, and thus it is seen that a different type of scanning technique must be used for systems required to operate at speeds much higher than those contemplated by Paranjpe et al.

For very high speed printing as required, for instance, in newspaper printing, it is feasible to use staggered rows of jets and photodetectors as taught in Taylor et al RE28219. This type of system provides solid printing coverage in a single pass, but it ialso requires a very large number of jets, photodetectors, and associated electronics. Such a system is inherently very expensive and provides printing speed capabilities far in excess of those required in applications such as office duplicating, wherein the speed requirement is in the order of about two printed pages per second.

Cahill et al U.S. Pat. No. 3,689,693 teaches a banding type of printing technique wherein a plurality of print heads cooperatively print an image upon a print sheet mounted on a rotating drum. The print heads are advanced axially while the drum rotates, and the axial advance is adjusted such that the printing head arrangement moves a distance equal to the width of one printing track during one drum rotation. Printing progresses until solid coverage is obtained. This technique requires relatively less movement than an interlacing technique of the type disclosed in Paranjpe et al. However, the arrangement as disclosed in Cahill et al scans, stores, and formats printing control information off line from the printing operation. No means are disclosed for "on line" document copying, and the multiple print head arrangement as disclosed is severely limited as to density of printing jets. Thus the system is quite slow and unsuited for use as an office copier.

Another important consideration, involved in the design of a suitable jet drop copying system has to do with the matter of document illumination. For higher speed operation of the type herein contemplated, the illumination requirements become quite severe. This is due to system noise which is inherent in the operation of a photodetector array. In order to produce a noise free signal for switching control of a jet, it is necessary to provide the photodetectors with incident light which is either long in duration or high in magnitude. For the very short observation times available in a high speed copier, a simple arrangement of illumination lamps, as shown in the above mentioned Paranjpe et al patent, has been found to be inadequate. A similar problem exists in high speed electrophotographic copiers. One solution, as taught in Libby U.S. Pat. No. 3,694,070, involves providing a pair of illumination lamps together with a pair of scanning reflectors that focus the light only on the area of the original document that is actually being optically scanned by the system.

SUMMARY OF THE INVENTION

In accordance with the present invention a jet drop copying apparatus is configured for printing a copy of an original document in a relatively small plurality of printing passes. An illumination system directs a narrow beam of illuminating light toward a strip extending laterally across the original document, and means are provided for longitudinally scanning the light along the length of the document in synchronism with the scanning operation of an imaging device. The imaging device focusses an image of the illuminated strip upon the face of the photodetector array. The photodetector array comprises a spaced arrangement of photodetectors which generate printing control signals for a jet printing head. The jet printing head produces a series of jets arranged in correspondence with the arrangement of photodetectors in the photodetector array and projects the jets toward a print receiving member. There is a printing drive means which produces relative movement between the print head and the print receiving member in synchronism with the scanning of the original image. Image shifting means are provided for progressively producing relative lateral shifting movement between the photodetectors and the light rays defining the image of the illuminated strip on the original document. Print shifting means are provided for progressively shifting the printing jets across the printing member in synchronism with the aforementioned image shifting. Print shifting and image shifting are both characterized by an operating cycle which produces a lateral shift of one resolution element during one longitudinal scanning cycle and which continues until solid coverage has been achieved.

DESCRIPTION OF THE PREFERRED EMBODIMENT

Figure 1:
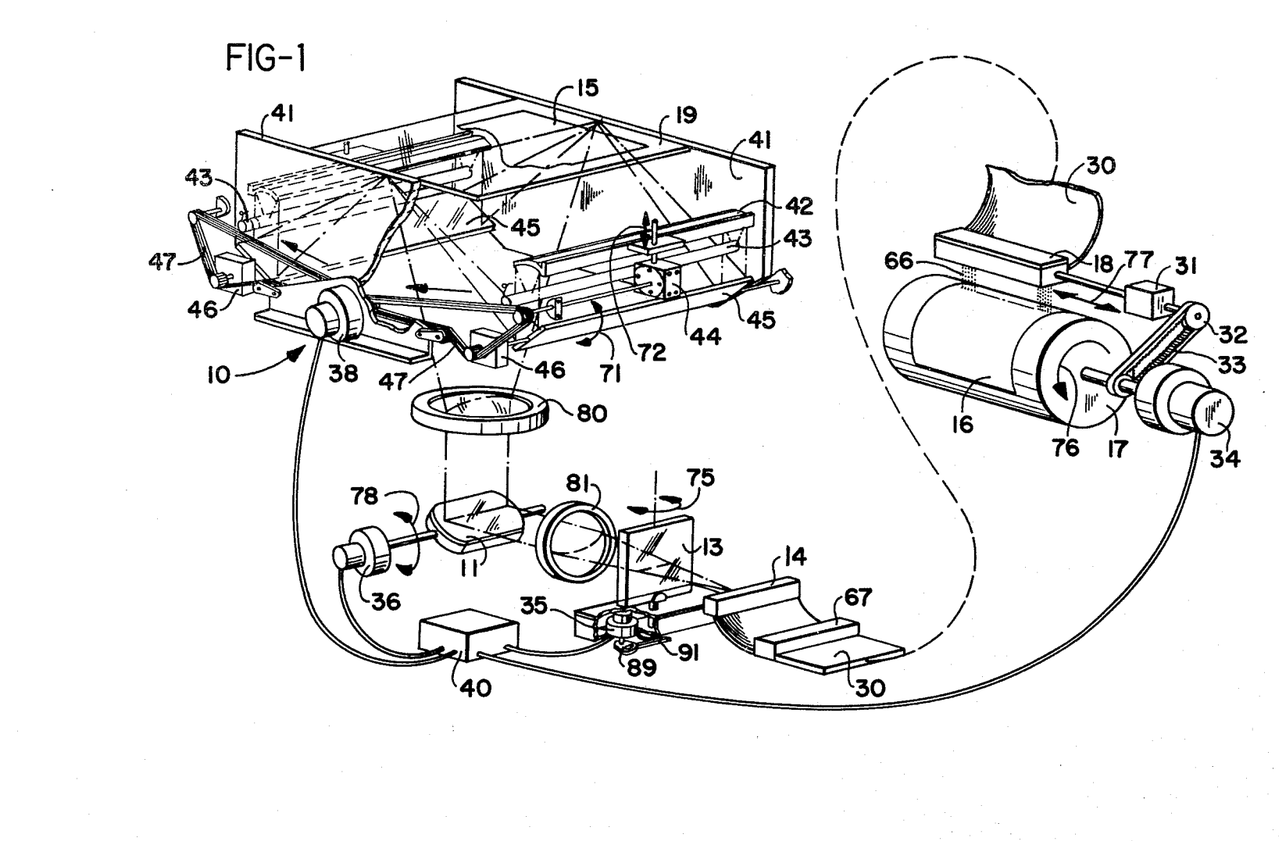
FIG. 1 is a pictorial illustration of a document reproduction system according to this invention.

A preferred embodiment of this invention as illustrated in FIG. 1 comprises an illumination station 10, a scanning mirror 11, a collimating lens 80, an imaging lens 81, an image shifting plate 13, a photodetector array 14, an ink jet print head 18, and a drum 17 for supporting a print sheet 16. Illumination station 10 includes a flat plate 19 for supporting an original document 15. The document 15 is scanned by two synchronously driven narrow beams of light, as hereinafter described, to create a narrow illuminated strip extending across one dimension of the document. The document portion which is so illuminated is imaged upon the face of photodetector array 14. Photodetector array 14 supplies scanning signals to a printing controller 67, which is connected via a set of electrical cables 30 to ink jet print head 18.

Printing controller 67 comprises a series of amplifiers which generate binary printing control signals as generally taught in Taylor et al U.S. Patent Re28219. Print head 18 produces a series of jets 66 which are controlled by the binary printing control signals to produce a representation of the scanned area of document 15 upon the surface of print sheet 16. In preferred embodiment print head 18 operates as taught in Taylor et al by generating streams of uniformly sized and regularly spaced drops; with the streams (or jets) being positioned in correspondence with the placement of the photodiodes comprising the array 14. The drop streams are selectively charged, deflected and caught, so that the printed pattern on print sheet 16 comprises a series of unchanged and undeflected drops.

A particularly preferred embodiment of print head 18 may be configured as described in Ser. No. 075,055 and stimulated as taught in Cha U.S. Pat. No. 4,095,232. Alternatively, other types of ink jet printers could be employed. For example it is feasible to employ a spray printer as taught in Hertz et al U.S. Pat. No. 3,416,153 or a drop-on-demand printer as taught in Stemme U.S. Pat. No. 3,747,120.

It is contemplated that the jets comprising the jet array be quite close together, but not so close together as to provide side-by-side overlapping print traces. In accordance with this invention means are provided for producing lateral movement of the jets in just that amount which is required for producing such side-by-side overlapping of the print traces. Preferably such lateral movement of the jets is provided by a cam arrangement 31 as shown generally in FIG. 1 hereof and as more fully described in Ser. No. 075,056. Alternatively, means may be provided for laterally oscillating printing drum 17 or laterally stepping the projection angle of jets 66. In the latter case the printing is produced by charged rather than uncharged drops.

Figures 5A, 5B, 5C, 7, 8A, 8B:
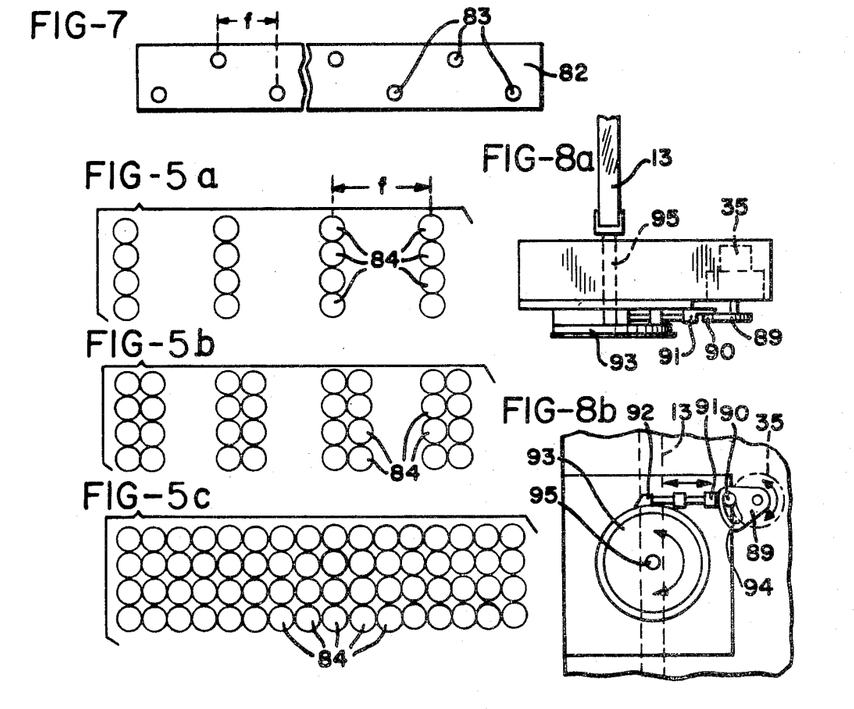
FIGS. 5a through 5c illustrate progressive printing by an ink jet printer.
FIG. 7 is an illustration of an orifice plate for an ink jet printer.
FIG. 8a is a front elevation view of drive mechanism for an image shifting plate.
FIG. 8b is a bottom plan view of drive mechanism for an image shifting plate.

In the preferred embodiment print head 18 is provided with an orifice plate 82, which has two rows of jet forming orifices, as illustrated generally in FIG. 7. The orifices in this arrangement are laterally separated by a center-to-center distance f, as illustrated. Accordingly, during one revolution of drum 17 the jets 66 print upon sheet 16 a pattern of dots 84, as illustrated generally in FIG. 5a. It will be seen that the printed dots 84 define a series of longitudinally extending tracks which are laterally spaced by a center-to-center distance f. This spacing distance f must be adjusted so as to achieve solid printing within the time permitted by copying speed requirements. The spacing distance and the total width of the printed reproduction then determine the number of jet printing channels required for the practice of the invention. It is a feature of the invention that requirements for scanning and drop control electronics are minimized in a manner consistent with system operating speed requirements.

FIGS. 5b and 5c illustrate the manner in which the separated jets produce solid printing. During the period of time that printing drum 17 makes one full revolution, the system produces a small relative lateral movement between the jets and the printing sheet 16. This relative movement may be progressive in nature or stepped at the end of each drum revolution and has a magnitude just sufficient to produce the side-by-side overlap illustrated in FIG. 5b. The process continues until full coverage is achieved, as illustrated in FIG. 5c.

As illustrated in FIG. 1, the above described jet movement proceeds under control of control unit 40, which controls a drive motor 34 to rotate the print drum 17 at a carefully controlled speed. A timing belt 33 is driven in common with the driving of drum 17, and timing belt 33 engages a gear 32 for operation of cam mechanism 31. The system is preferably designed to print from right-to-left and from left-to-right, so that flyback of the head is not required. There is no spiral interlacing of tracks from different jets, and this substantially reduces the amount of required print head movement.

In a typical embodiment of this invention the production rate is 120 copies per minute. For such a system the distance f is about 0.0075 inches, and the ink flow rate is adjusted to produce printed dots having a diameter of roughly one-fourth f. Thus four revolutions of the drum 17 are required for each printed copy, and print head 18 is shifted about 0.001875 inches for each drum revolution. This produces a printed copy having a printing resolution slightly greater than 500 lines per inch.

Figure 6:
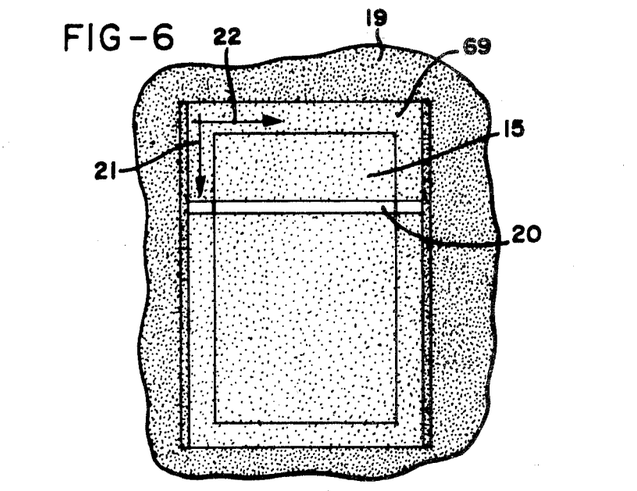
FIG. 6 is an illustration of an illuminated strip on a document.

Scanning of a document 15 will now be described with reference to FIG. 6, wherein the document 15 is illustrated as being positioned upon a supporting glass plate 69 within the support surface 19. Document 15 is illuminated by an elongated beam of light to create a narrow illuminated strip 20 extending laterally across the document in a first direction parallel to the directional arrow 22. The beam of illuminating light is scanned longitudinally across document 15 in a second direction as indicated by the arrow 21.

Figure 2A:
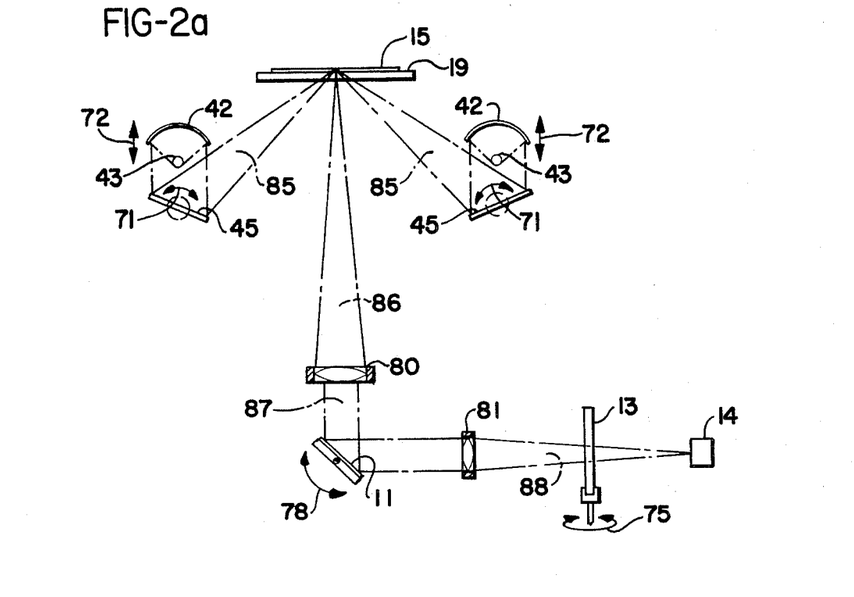
FIGS. 2a and 2b are schematic front elevation views of a document scanning system at different times in the longitudinal scanning sequence.
Figure 2B:
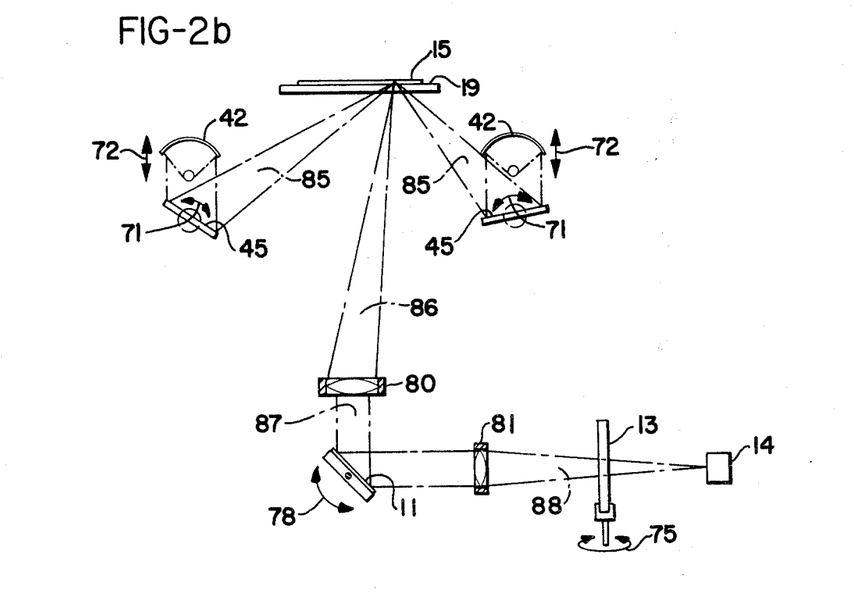

Apparatus for creating and scanning the illuminated strip 20 is shown schematically in FIG. 2a and 2b as including a pair of illuminating lamps 43, 43, a pair of focussing reflectors 42, 42, and a pair of flat reflecting mirrors 45, 45. The illuminating lamps 43, 43, extend transversely across illuminating station 10, as best illustrated in FIG. 1. Light which is generated by lamps 43, 43, is focussed by focussing reflectors 42, 42, into a pair of converging light beams 85, 85. Light beams 85, 85, are directed toward mirrors 45, 45, for convergence at the surface of document 15. The convergence of beams 85, 85, at the surface of documents 15 defines illuminated strip 20.

Scanning of beams 85, 85, is accomplished by synchronous oscillation of mirrors 45, 45, as indicated by the directional arrows 71, 71. For this purpose there are provided a pair of conjugate cam mechanisms 46, 46, as illustrated generally in FIG. 1. A pair of timing belt assemblies 47, 47, are driven by an electric motor 38 in the direction of the arrows 70, 70, to operate cam mechanisms for causing forward scanning and high speed flyback of mirrors 45,45.

Illuminated strip 20 comprises superimposed one-dimensional images of the electrical filaments within illumination lamps 43, 43. In order to maintain one-dimensional focus of the filaments reflectors 42, 42, are moved vertically back and forth under control of conjugate cam mechanisms 44, 44, as indicated by the arrows 72, 72. The movement of reflectors 42, 42, proceeds in synchronism with the scanning oscillation of mirrors 45, 45, so as to maintain the illuminated strip 20 at the focal lines of both of reflectors 42, 42. This produces a very narrow and intense strip of illumination. Cam mechanisms 44, 44, are also driven by timing belts 47, 47, as illustrated generally in FIG. 1. Cam mechanisms 44 and 46 are described more fully in Ser. No. 075,054.

Preferably reflectors 42, 42, are of generally trough shaped configuration with an elliptical crosssection. This configuration produces the above mentioned one-dimensional image of the illumination filaments, without production of any observable representation of the actual structure of the electrical filaments. The creation of the intense, superimposed one-dimensional images of the electrical filaments of lamps 43, 43, is substantially enhanced by side mirrors 41, 41, as more fully described in Ser. No. 075,297.

Reflected light from illuminated strip 20 is directed toward a scanning mirror 11, which projects an image of the illuminated region of the document upon the face of photodetector array 14. A D.C. electrical servomotor 36 operates under control of control unit 40 to give mirror 11 an oscillating rotational motion as illustrated by the arrow 78. An optical grating on the glass 69 (not illustrated) is imaged upon one of the photodetectors to provide an appropriate feedback control signal, as described in detail in Monette pending application Ser. No. 950,253 filed Oct. 10, 1978.

The rotation of mirror 11 proceeds in synchronism with the oscillating movement of mirrors 45, so that the photodetector array 14 always looks at that portion of the document which is being illuminated. Printing system drive motor 34 operates in synchronism with the forward scanning movement of scanning mirror 11. An optical scanner positioned adjacent printing drum 17 (not illustrated) detects the positioning of paper 16, so that control unit 40 is able to assure flyback of mirrors 11 and 45 during the time while the back side of the drum being presented to print head 18.

Figures 3A, 3B, 4A, 4B, 4C:
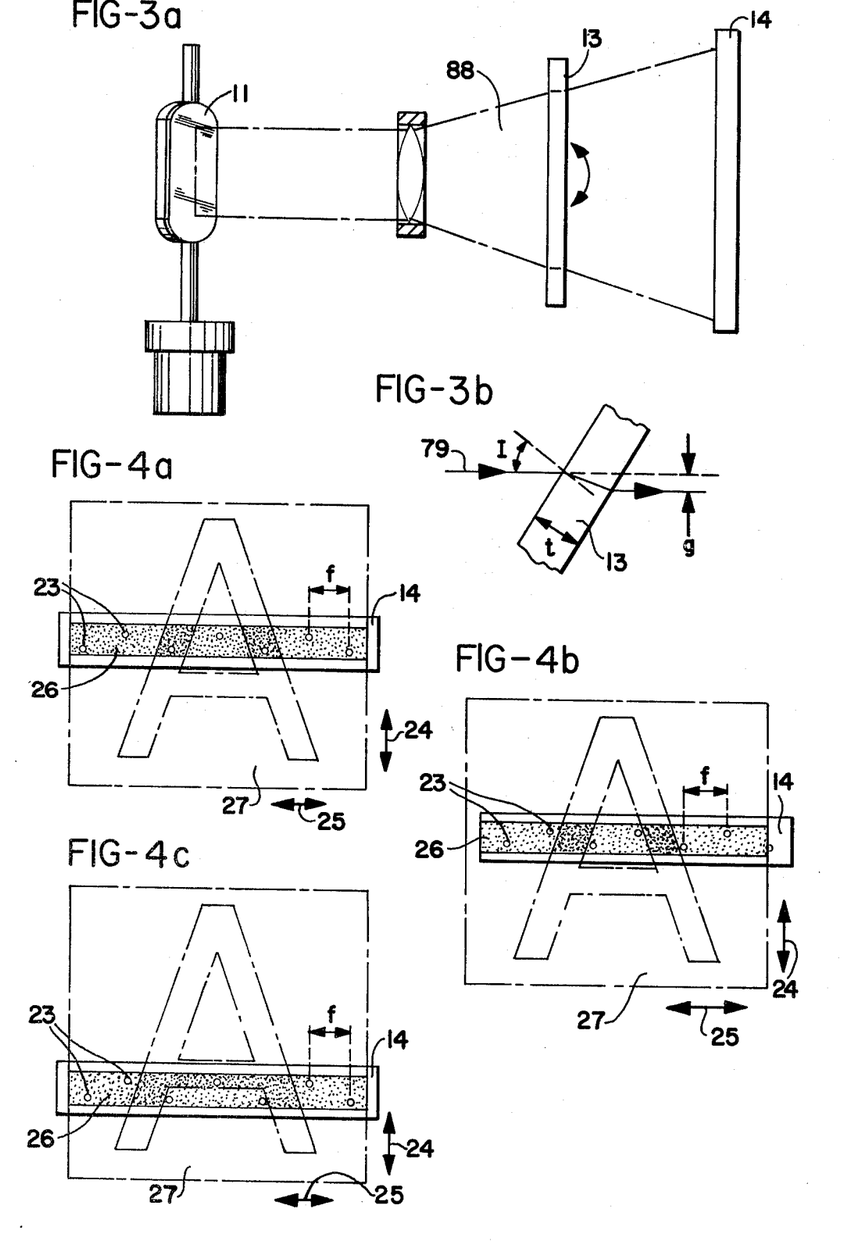
FIG. 3a is a schematic top plan view of optical elements which produce lateral image shifting.
FIG. 3b is a schematic illustration of the shifting of a light ray by a plane parallel plate.
FIGS. 4a through 4c illustrate the lateral and longitudinal motion of an image.

Photodetector array 14 comprises a series of photodetectors 23 arranged in two interlaced rows, which scan an image in a manner as generally illustrated in FIGS. 4a through 4c. This arrangement of photodetectors correspond to the arrangement of orifices 83 in orifice plate 82. Thus photodetectors 23 have center-to-center spacing f and collectively view only one-fourth of the projected image during one scan of scanning mirror. The blind spots are successively viewed by lateral shifting of the projected image in synchronism with the lateral shifting of print head 18. In this connection it is to be noted that there is no lateral movement the imaging optics or the document 15. The image forming light rays pass through image shifting plate 13, and all image shifting is accomplished by rotary oscillation of the image shifting plate.

Document scanning progresses only in the longitudinal direction, as described above, and the same regions are illuminated and scanned four times in succession. Between longitudinal scans of the document, image shifting plate 13 is rotated a very small angular distance, so that the light rays reflected from the document 15 are directed toward different positions on the photocell array. This shifting of the image relative to the photo-sensor array enables all portions of the document to be viewed by the photo-sensors.

FIGS. 3a and 3b illustrate the movement of image shifting plate 13 and the resultant movement of the image relative to detector array 14. FIG. 3b is an enlarged view of a portion of FIG. 3a and illustrates the path of a ray of light 70 through the plate 13. For clarity of illustration the figure shows a fairly large tilt angle for the plate 13. It will be understood that the angle of incidence I actually never gets greater than about $1\frac{1}{2}°$ for the embodiment of the invention as herein described. The image shifting arrangement operates in a manner similar to an optical micrometer so that the shifting distance g is given approximately by the formula:

$$g = (TI(N-1)/N$$

where t is the thickness of plate 13, N is the index of refraction of the glass comprising plate 13, and I is expressed in radians. In a typical embodiment of the invention the thickness may be about 0.63 inches and the index of refraction about 1.517, so that an angular rotation of 0.5 degrees produces an image displacement of 0.001875 inches to match the movement of print head 18 during one rotation of printing drum 17.

The mechanism for rotating the image shifting plate 13 is illustrated in detail in FIGS. 8a and 8b. The driving element is stepping motor 35, which rotates a cam 89 in response to control signals from control unit 40. Cam 89 has a slotted cam surface 94 for guiding a cam follower 90, which is mounted on a push rod 91. Rotational motion of cam 89 causes push rod 91 to push against an ear 92 of a disc 93. Disc 93 is mounted on the support shaft 95 for image shifting plate 13 and is caused to oscillate in stepwise fashion by the pushing and pulling of cam 89 against push rod 91.

Cam surface 94 is configured so as to produce rotational motion of plate 13 which corresponds to the linear movement of print head 18. As explained above, the printer prints bidirectionally from left-to-right and from right-to-left. Accordingly plate 13 oscillates progressively back and forth, without flyback between scans. The arrangement is characterized by a rather considerable reduction in rotary motion transferred from stepping motor 35 to image shifting plate 13, and this results in highly accurate control of very small output rotations.

The bundle of light rays which are reflected from the face of document 15 and which are scanned and shifted as described above, are illustrated in FIGS. 2a and 2b as generally indicated at 86. These rays pass through a collimating lens 80 to produce a bundle of collimated rays, as indicated at 87. The collimated rays 87 are reflected from the surface of scanning mirror 11 and then pass through imaging lens 81 to become a converging bundle of rays, as indicated at 88. The ray bundle 88 passes through scanning plate 13 and converges for focussing at the image plane of the lens 81. Photodetector array 14 is positioned at the image plane for viewing the image which is so focussed.

Reference now is made to FIGS. 4a through 4c wherein are illustrated a viewing window 26 which is the region within the image plane where the ray bundle 88 happens to be focussed. The synchronous movement of mirrors 11 and 45 cause the viewing window 26 to be fixed in space, thereby defining an aperture through which an image of document 15 appears to move. The image within the window 26 forms a portion of a larger "potential" image 27 as outlined by phantom lines in FIGS. 4a through 4c. This larger potential image represents the image which would be present at the image plane, if the entire face of document 15 were being illuminated and observed at any one time.

FIG. 4a depicts a first position of the potential image 27. FIG. 4b is similar to FIG. 4a but illustrates shifting movement of the image 27 in the direction 25. FIGS. 4a and 4b therefore illustrate the relative position of the image at corresponding times during different scans of the mirror 11. During the course of one complete scanning cycle by mirror 11, image 27 is shifted laterally a distance equal to the viewing width of one photodetector. Thus after 4 complete scans, all areas of the document 15 have been imaged within the window 26 and have been viewed by one or another of photodetectors 23. FIG. 4c illustrates the scanning movement which is produced in the direction 24 by scanning rotation of mirror 11.

Those who are skilled in the field of optics will understand that flat field scanning as herein described produces optical path length variations throughout the scanning operation of scanning mirror 11.

The above mentioned distortion can be corrected by introducing a correcting distortion into the collimating lens 80. Unfortunately, such a correction produces a distortion of the opposite type along the sides of the scanned image. As a practical matter a compromise is achieved by introducing only a partial correction into collimating lens 80. The correction is made in such an amount as to result in a small but acceptable distortion around the entire perimeter of the image.

In a preferred embodiment as herein described, collimating lens 80 comprises an arrangement of elements, which produce a negative distortion of about 2.5% at the maximum angle off the optical axis. The radius of curvature, thickness, index of refraction, Abbe number and spacing of the five elements are selected in accordance with conventional optical design procedures so as to produce the desired distortion while simultaneously correcting the usual aberrations encountered in lens design.

As an alternative to the above described arrangement, image distortion can be removed by introducing a compensating distortion into both the collimating lens 80 and the imaging lens 81. In a typical embodiment of this alternative arrangement the lenses 80 and 81 may each comprise five elements which collectively provide a negative distortion of 2.5%.

In another alternative arrangement image distortion can be removed by moving lens 80 in the axial direction in synchronism with the scanning motion of mirror 11. Still another alternative arrangement may employ a lens comprising a moving doublet as described in Ser. No. 075,067. It will also be understood that while the photosensors 23 are laterally separated as herein described, each photosensor may be replaced by a linearly arranged series of charge coupled devices as taught in Ser. No. 075,065.

While the forms of apparatus and the methods herein described constitute preferred embodiments of the invention, it is to be understood that the invention is not limited to these precise forms of apparatus, and that changes may be made therein without department from the scope of the invention.

What is claimed is:

1. Jet drop copying apparatus comprising:
   document support means for supporting an original document to be copied,
   illumination means for creating an elongated beam of illuminating light and directing said beam of light toward said document support to create an illuminated strip extending laterally across said document,
   a cyclically operating illumination scanner for scanning said beam of light and causing said illuminated strip to move repetitively across said document in a longitudinal direction,
   imaging means for observing at least that portion of said document including said strip and projecting an image of the viewed area upon an image plane,
   an image scanner operating in synchronism with said illumination scanner so that the light reflected from said illuminated strip is directed toward an imaging window within said image plane,
   a photodetector array positioned within said window and comprising a series of photodetectors for sensing image light levels at spaced positions extending along the length of said window, image shifting means operable in synchronism with said image scanner for progressively producing relative lateral shifting movement between said photodetectors and said image; said image shifting means having an operating cycle which produces an amount of shifting movement equal to the viewing width of one of said photodetectors during one scanning cycle of said image scanner and which continues said shifting until all portions of said document have been viewed.

Printing control means connected to said photodetectors for generating printing control signals in response to light levels sensed by said photodetectors, copy support means for supporting a print receiving member, a jet printing head operable under control of said printing signals for projecting drops of printing liquid along paths toward a series of laterally spaced printing positions on said print receiving member, printing drive means operating in synchronism with said image scanner to produce cyclical relative movement between said jet drop printing head and said copy support means such that the printing drops which are deposited at said spaced positions define a series of longitudinally extending printing tracks, and print shifting means operable in synchronism with said image shifting means for progressively shifting said printing positions in the lateral direction; said print shifting means having an operating cycle which shifts said printing positions a distance equal to the printing width of one of said printing tracks during one driving cycle of said printing drive means and which continues said shifting until solid printing coverage of said printing member has been achieved.

2. Apparatus according to claim 1 wherein said image shifting means comprises refraction means positioned in the optical path of said imaging means for controlling the projection angle of said path and image shifting drive means for rotating said refraction means to produce said relative movement.

3. Apparatus according to claim 2 wherein said image shifting drive means rotates said refraction means about an axis substantially perpendicular to said optical path.

4. Apparatus according to any of claims 1, 2 or 3 wherein said image scanner comprises reflection means positioned within the optical path of said imaging means and means for rotating said reflection means about an axis parallel to said strip.

5. Apparatus according to claim 4 wherein said illumination means comprises a source of illuminating light and a curved illumination reflector for collecting said light and forming said beam of illumination, and wherein said illumination scanner comprises a flat illumination reflector placed in the path of said beam and means for rotating said flat illumination reflector about an axis parallel to said strip.

6. Apparatus according to claim 5 and comprising two illumination arrangements, each comprising an aforesaid illumination means and an aforesaid illumination scanner.

7. Apparatus according to claim 6 wherein said illumination arrangements face each other from opposite sides of said document.

8. Apparatus according to claim 7 wherein said copy support means comprises a cylindrical drum and wherein said printing drive means comprises motive means for rotating said drum about its cylindrical axis.

9. Apparatus according to claim 8 wherein said print shifting means comprises means for reciprocating said print head back and forth along a line parallel to said drum.

10. Apparatus according to claim 4 wherein said imaging means comprises a collimating lens positioned between said reflection means and said document support means and an imaging lens positioned between said reflection means and said photodetector array.

11. Apparatus according to claim 10 wherein said imaging means distorts the light passing therethrough in an amount which partially corrects image distortion inherently produced by the rotating motion of said reflection means.

12. Apparatus according to claim 11 wherein said image shifting means are positioned between said imaging lens and said photodetector array.

13. Apparatus according to claim 11 wherein said image shifting means comprises a refractive glass plate perpendicular to the optical path of said imaging means and a stepping motor for rotating said glass plate about an axis also perpendicular to said optical path.

14. Apparatus according to claim 1 wherein said image shifting means comprise a refractive glass plate perpendicular to the optical path of said imaging means and a stepping motor for rotating said glass plate about an axis also perpendicular to said optical path.

15. Apparatus according to claim 14 and further comprising motion reducing means between said stepping motor and said glass plate.

16. Jet drop copying apparatus comprising:
document support means for supporting an original document to be copied, a pair of illuminating lamps positioned below said document support means at opposite ends thereof and extending laterally for a distance at least equal to the full width of a document to be copied, a pair of illumination reflectors for collecting the light from said lamps and forming the collected light into a pair of elongated light beams, illumination scanning means for directing said light beams toward a common illuminated strip extending laterally across said document and cooperatively scanning said beams cyclically in the longitudinal direction along the length of said document, imaging means for observing at least that portion of said document including said strip and projecting an image of the viewed area upon an image plane, an image scanning mirror positioned in the path of said imaging means and operating in synchronism with said illumination scanner so that the light reflected from said illuminated strip is directed toward an imaging window within said image plane, a photodetector array positioned within said window and comprising a series of photodetectors for sensing image light levels as spaced positions extending along the length of said window, a refractive glass plate positioned in the optical path of said imaging means refractive glass plate positioned in the optical path of said imaging means for shifting the position of said image relative to said photodetectors, image shifting drive means for rotating said glass plate in synchronism with the operation of said image scanner and through an operating cycle which produces image shifting movement equal to the viewing width of one of said photodetectors during one scanning cycle of said image scanner and which continues said shifting until all portions of said document have been viewed, printing control means connected to said photodetectors for generating printing signals in response to light levels sensed by said photodetectors, a cylindrical drum for supporting a print receiving sheet, a jet printing head operable under control of said printing signals for projecting drops of printing liquid along paths toward a series of laterally spaced printing positions on said print receiving sheet, printing drive means operating in synchronism with said image scanner to rotate said printing drum about its cylindrical axis and cause said jets to produce drop patterns at spaced positions defining a series of longitudinally extending printing tracks, print shifting means for reciprocating said print head back and forth along a line parallel to the axis of said drum in synchronism with the operation of said image shifting means; the reciprocating action of said print shifting means having an operating cycle which shifts said printing positions a distance equal to the printing width of one of said printing tracks during one driving cycle of said printing drive means and which continue said shifting until solid printing coverage of said printing sheet has been achieved.

17. Method of document reproduction comprising the steps of:

(1) directing an elongated beam of light toward a document and illuminating a narrow strip extending laterally thereacross, (2) repetitively illuminating all parts of said document by scanning said beam of light longitudinally therealong, (3) projecting an image of said document toward an image plane, (4) scanning said image longitudinally across said image plane in synchronism with the scanning of said light beam, so that images of all illuminated strips of said document are sequentially projected upon a fixed imaging window within said imaging plane, (5) detecting the light levels at laterally spaced positions along said imaging window and generating printing control signals corresponding thereto, (6) producing relative lateral shifting between said spaced positions and said image, so that said printing control signals sequentially represent information content at side-by-side positions on said document, (7) projecting drops of printing liquid toward a series of laterally spaced printing positions on a printing sheet under the printing control of said printing control signals, (8) producing cyclical relative longitudinal movement between said drops and said printing sheet in synchronism with the longitudinal scanning of said light beam, (9) producing relative lateral shifting movement between said drops and said printing sheet in synchronism with said relative lateral shifting between said spaced positions and said image, and (10) continuing aforesaid steps until all portions of said document have been scanned repetitively by said light beam, detected once within said imaging window, and reproduced by said drops.

18. A method according to claim 17 wherein a plurality of copies of said document are reproduced in sequence upon a plurality of printing sheets; the direction of relative lateral shifting movement between said spaced positions and said image and the direction of relative lateral shifting movement between said drops and said printing sheet being reversed for each new copy.

* * * * *